US012638057B2

(12) United States Patent
Shrive et al.

(10) Patent No.: US 12,638,057 B2
(45) Date of Patent: May 26, 2026

(54) HYDROSTATIC RADIAL PISTON UNIT

(71) Applicant: Danfoss Power Solutions (Jiangsu) Co. Ltd., Zhenjiang (CN)

(72) Inventors: Chris Shrive, Edinburgh (GB); Yanjiang Wan, Jiangsu (CN); Ruhuan Chen, Zhenjiang (CN)

(73) Assignee: DANFOSS A/S, Nordborg (DK)

( * ) Notice: Subject to any disclaimer, the term of this patent is extended or adjusted under 35 U.S.C. 154(b) by 224 days.

(21) Appl. No.: 18/256,976

(22) PCT Filed: Dec. 29, 2020

(86) PCT No.: PCT/CN2020/141046
§ 371 (c)(1),
(2) Date: Jun. 12, 2023

(87) PCT Pub. No.: WO2022/126757
PCT Pub. Date: Jun. 23, 2022

(65) Prior Publication Data
US 2024/0093666 A1 Mar. 21, 2024

(30) Foreign Application Priority Data

Dec. 16, 2020 (CN) .......................... 202011486268.2

(51) Int. Cl.
F16D 55/40 (2006.01)
B60K 7/00 (2006.01)
(Continued)

(52) U.S. Cl.
CPC ............ F16D 55/40 (2013.01); F03C 1/0406 (2013.01); F03C 1/047 (2013.01); F04B 1/0404 (2013.01);
(Continued)

(58) Field of Classification Search
CPC ................. F16D 55/40; F16D 2121/12; F16D 2055/0058; F16D 55/36; F16D 65/186;
(Continued)

(56) References Cited

U.S. PATENT DOCUMENTS 5,220,790 A * 6/1993 Allart ...................... F03C 1/045
60/435
5,992,578 A * 11/1999 Lallier .................... F16D 55/36
188/170
(Continued)

FOREIGN PATENT DOCUMENTS

CN 103562541 A 2/2014
CN 114635824 A 6/2022
(Continued)

OTHER PUBLICATIONS

International Search Report mailed on Jun. 24, 2021, in connection with corresponding International Application No. PCT/CN2020/141046; 4 pages.

*Primary Examiner* — Peter J Bertheaud
(74) *Attorney, Agent, or Firm* — McCormick, Paulding & Huber PLLC

(57) ABSTRACT

Hydrostatic radial piston unit comprising a front case part accommodating a drive shaft via shaft bearing means so that the drive shaft can rotate around a central axis relative to the front case part. A rear case part is attached on one side to the front case part and closed on another side in order to define an internal volume. A cylinder block is disposed in the internal volume and attached to the drive shaft in a torque proof manner. Axially disposed timing holes in the cylinder block connect radially oriented working volumes in the cylinder block with a cylinder block front face that is arranged perpendicularly to the central axis and faces away from the front case part. Integrally within the rear case part internal annular flow passages are formed and are connected (Continued)

to an inlet and an outlet of the radial piston unit and running basically in circumferential direction around the central axis. Internal distribution conducts configured to hydraulically connect the internal annular flow passages with the cylinder block timing holes are integrally formed within the rear case part, too.

20 Claims, 3 Drawing Sheets

(51) Int. Cl.

| | |
|---|---|
| *F03C 1/047* | (2006.01) |
| *F03C 1/28* | (2006.01) |
| *F04B 1/0404* | (2020.01) |
| *F04B 1/047* | (2020.01) |
| *F04B 1/1071* | (2020.01) |
| *F04C 2/04* | (2006.01) |
| *F04C 15/00* | (2006.01) |
| *F16D 55/00* | (2006.01) |
| *F16D 55/36* | (2006.01) |
| *F16D 59/02* | (2006.01) |
| *F16D 65/18* | (2006.01) |
| *F16D 121/12* | (2012.01) |

(52) U.S. Cl.
CPC ............ *F04B 1/047* (2013.01); *F04B 1/1071* (2013.01); *F04C 2/04* (2013.01); *F04C 15/0084* (2013.01); *F16D 55/36* (2013.01);

*F16D 59/02* (2013.01); *F16D 65/186* (2013.01); *B60K 2007/0092* (2013.01); *F16D 2055/0058* (2013.01); *F16D 2121/12* (2013.01)

(58) Field of Classification Search
CPC .................. F16D 59/02; B60K 7/0015; B60K 2007/0092; F03C 1/047; F03C 1/0403; F04B 1/047; F04B 1/0404; F04B 1/1071; F04C 15/0084; F04C 2/04
See application file for complete search history.

(56) References Cited

U.S. PATENT DOCUMENTS

| | | |
|---|---|---|
| 2012/0036994 A1 | 2/2012 | Souply et al. |
| 2013/0180237 A1 | 7/2013 | Recoura et al. |

FOREIGN PATENT DOCUMENTS

| | | |
|---|---|---|
| CN | 116265737 A | 6/2023 |
| CN | 116335907 A | 6/2023 |
| DE | 102013212589 A1 | 12/2014 |
| DE | 10 2016 214 967 A1 | 2/2018 |
| EP | 2 617 985 A1 | 7/2013 |
| FR | 3 048 473 A1 | 9/2017 |
| WO | 9943947 A1 | 9/1999 |

* cited by examiner

HYDROSTATIC RADIAL PISTON UNIT

CROSS-REFERENCE TO RELATED APPLICATIONS

This application is a National Stage application of International Patent Application No. PCT/CN2020/141046, filed on Dec. 29, 2020, which claims priority to Chinese Patent Application No. 202011486268.2, filed on Dec. 16, 2020, each of which is hereby incorporated by reference in its entirety.

TECHNICAL FIELD

The present innovation relates to a hydrostatic radial piston unit, more particular to cam lobe or orbital motors or pumps, respectively.

BACKGROUND

Radial piston motors are widely used in the art and are characterized in that their working pistons are moving in radial direction with respect to a drive shaft, when supplied with pressurised hydraulic fluid. Cam lobe and orbital motors are used in the art for heavy duty applications, for instance. In general, radial piston units are used in hydraulic applications which do not require high rotational speeds. However, radial piston units show the advantage over axial piston units of a reduced axial construction space.

Even though radial piston motors of the cam lobe or the orbital construction are well known in the art, there is an ongoing objective to reduce the external dimensions, in particular the axial dimensions of such radial piston units while maintaining or even improving their performance characteristics.

DE 10 2016 214 967 A1 discloses a hydrostatic radial piston unit with rotating cylinder block. The radial piston unit can be operated with six different volume flows per revolution of the cylinder block and comprises a multi part casing. In one part of the casing ring channels are formed.

FR 3 048 473 A1 shows a hydraulic motor which is equipped with a brake arranged in a separate housing. The brake is pre-tensioned by a plate spring which is disposed between a pressurizable piston and a housing cover. Annular channels are formed in the casing of the hydraulic motor by means of inner grooves and a distributor.

SUMMARY

Hence it is object of the present invention to improve the known radial piston units of the cam lobe or the orbital type of construction. By doing this, the robustness should be kept high and manufacturing costs and maintenance effort should be reduced. Further, the radial piston units according to the invention should be improved in the sense of operational flexibility, smooth running, low wear and easy as well as reliable controllability of operating conditions.

The object of the invention is solved by a hydrostatic radial piston unit according to claim 1, wherein preferred embodiments are disclosed in the subclaims directly or indirectly depending on claim 1.

The inventive object is solved by the hydrostatic radial piston unit according to claim 1 being of the cam lobe or orbital type of construction, comprising a front case part which accommodates a drive shaft. The drive shaft is mounted in the front case by means of bearing means, so that it can rotate relative to the front case part around a central axis. To one side of the front case part a rear case part is attached, which is closed on the opposite side, facing away from the front case in order to define an internal volume which is preferably hydraulically sealed. Within this internal volume, a cylinder block is attached, typically in the area of the front case part, to the drive shaft in a torque proof manner, wherein, in an exemplary embodiment, the drive shaft extends further on towards the rear case part. In the cylinder block, basically axially oriented timing holes are disposed. These timing holes connect radially oriented working volumes in the cylinder block with a cylinder block front face arranged perpendicularly to the central axis and faces away from the front case, i.e. faces towards the rear case part.

According to the invention, within the rear case part, internal annular flow passages are formed integrally with the rear case part, which are running in circumferential direction around the centre axis and are configured to be hydraulically connected to an inlet and an outlet of the radial piston unit. The internal annular flow passages are further connected to generally axial oriented internal distribution conducts which are, according to the invention, also integrally formed within the rear case part. Deviating from the known state of the art, the invention utilizes a rear case part, in which the circumferential running annular flow passages and the axial oriented distribution conducts for supply and drainage of hydraulic fluid to the working volumes of the radial piston unit are formed integrally within the rear case part.

By applying such a rear case part according to the invention with integrally formed annular flow passages and axial distribution conducts, more freedom of design for the rear case is given in comparison to rear case solutions of the state of the art. One main difference lies in that the rear case part of the invention is of one single-part and does not require a separate distribution element, as provided for the radial piston units known from the art. In general, to provide hydraulic fluid connection between the inlet and the outlet and the cylinder block, annular flow channels and distribution conducts are necessary. Commonly, in rear cases of the state of the art, the annular flow channels are divided and composed partly by radial inwardly open channels in the rear casing and by radial outwardly open channels in an additional so-called fluid distributor, having usually the form of a stepped cylinder. This stepped design of the state of the art fluid distributors is caused on one hand by the fact that at least two annular flow channels with two different pressure levels have to be completed by two corresponding annular distributor channels in order to form at least two annular flow passages. On the other hand, the axially oriented distributor conducts connecting the (two) annular flow passages with the timing holes of the cylinder block have to be on the same reference diameter. As half of the number of distributor conducts are connected to one annular flow passage on a first pressure level and the other half of the number of the distributor conducts are connected to the other annular flow passage on a second pressure level, and, further, as the distributor conducts with different pressure levels are arranged alternatively around the reference diameter, the connection of the distributor conducts to the respective two annular flow passages has to be on different reference diameters. This may cause the stepped design of the radial inner side of the rear cases according to the prior art, and, in consequence, the stepped design of the distributor part.

Furthermore, the stepped distributor part according to the prior art has to be mounted with a plurality of (ring) seals into the rear case part in order to fluidly separate the annular flow passages from each other and to seal these annular flow passages towards the interior of the rear case. Hence, at least three seals are necessary to separate two annular flow passages from each other and to seal them against the interior volume of the rear case.

Deviating from this state of the art multi-part solution for forming annular flow passages, the invention integrally forms the annular flow passages together with the distributor conducts into a single-piece rear case part. By doing this, a great freedom of design for the rear case part is obtained, leading to a plurality of beneficial embodiments, which compensate the higher effort in manufacturing the one-piece rear case part, as a separate fluid distributor element is no longer necessary nor seals for sealing the distributor with the rear case part.

A person with skills in the art recognizes that manufacturing such a one-piece rear case part with undercuts in direction of demoulding requires production methods like, e.g., sand-moulded casting or an additive manufacturing process. A person with skills in the art will know a lot of other possibilities to manufacture such a rear case part according to the invention, hence, all of them are covered by the inventive idea.

According to the state of the art, at least two (casted) parts and at least three seals are necessary to provide the same functionality as the single-piece rear case part according to the invention. Further, the two casing parts according to the art have to be machined very accurately in order to obtain a good surface quality for the sealing surfaces, which have to be capable to withstand the high pressure conditions in which radial piston units are normally used. As casing parts are usually manufactured by casting, a machining of concentric surfaces, and circumferential internal and external grooves in the two casting parts, needs further pre-preparation work of generating (auxiliary) reference surfaces on these casing parts for achieving accurate clamping of these parts for milling and turning in machine tools, for instance. Hence, by integrating the annular flow passages into the rear case, machining time and costs can be reduced significantly, too. Furthermore, logistic and assembly costs for assembling the distributor and the rear case parts in the sealed manner are also reduced, as no handling and assembly of two casing parts with at least three seals is necessary any longer.

As already indicated above, the integration of the annular flow passages in the rear case part of the radial piston unit casing does not only eliminate the separate distributor element and the seals, it also provides for a greater freedom of design in arranging the function elements to be part of a radial piston unit. E.g. this integration provides the possibility to move the annular flow passages towards the radial outside of the rear case part, freeing construction space radially inwards for the arrangement of other components, thereby increasing the compactness of the radial piston unit and, e.g., reducing the axial length.

In the state of the art, annular flow passages often show a stepwise arrangement in order to utilize the inner part of the rear case for a distribution element for providing hydraulic fluid flow to and from the working volumes and to keep especially the external radial dimensions of the radial piston unit as small as possible. By means of integrating the distribution channels as internal distribution conducts in the rear casing as the invention does, these conducts can be arranged on a reference diameter closer to the reference diameter of the internal annular flow passages. Further, the annular flow passages according to the invention can be arranged in a preferred embodiment in axial as well as in radial direction closer to each other since sealing and/ mounting surfaces can be renounced. Here, radial connection holes connecting the annular flow passages in radial direction with fluid distribution conduits can, according to the invention, be very much shorter than the ones according to the art realized by machining on a separate distributor element, for instance. Hence the package of annular flow passages together with the connecting channels according to the invention show a very much compacter design, which, additionally, can be moved more towards the radially outside of the radial piston unit, with the benefit that the radial inner region of the rear case part can be used for the accommodation of other parts or elements of the radial piston unit, e.g. a park brake mechanism or parts of them, for distributor plates or pistons, for bearings, sensors, etc.

By means of moving the package of annular flow passages and distribution conducts towards the radially outside of the radial piston unit, wherein the distribution conducts are preferably arranged radial inwards of the annular flow passages, the timing holes at the cylinder block also can be moved towards the radial outside, and, therewith, the bottom surfaces of the working cylinders, providing the possibility to increase the number of working volumes while maintaining the volumetric size of the radial piston unit. To achieve this, the individual working volume/stroke and diameter of the working pistons can be reduced and, therewith, the axial length of the cylinder block. By doing this, the ratio of working piston height and working piston diameter should be considered to avoid tilting of the working piston. In implementing smaller working volumes, especially a reduced stroke of the working pistons, the radial inner region of the cylinder block can be used for receiving at least partially other components of the radial piston unit, therewith contributing further in the reduction of axial length of the radial piston unit. E.g. bearings or part of bearings, preferably taper bearings, can find axial space within the cylinder block. Also, pressure force distribution plates, for example, can be received at least partially in recesses in the cylinder block adjacent to the through bore, in which the drive shaft of the radial piston unit is received in the cylinder block.

The before mentioned leads also to another beneficial point of the inventive idea, e.g. to the usability of a simple disc-type pressure force distributor plate for providing a sliding surface to the cylinder block front face, on which timing holes for the supply and drainage of hydraulic fluid to and from working volumes are arranged. Such a pressure force distributor for reducing friction and wear at the sliding contact surface can be disc or plate shaped-like, with simple through holes for forwarding hydraulic fluid from the internal distribution conducts to the timing holes at the cylinder block. Here, the through holes in the pressure force distribution plate can be oriented parallel or inclined, with respect to the rotational axis of the drive shaft, i.e. the central axis of the radial piston unit.

By using such a plate-type distributor, which is rotationally fixed to the one-piece rear case part, differences in the reference diameter of the distributor conducts and the timing holes in the cylinder block can be compensated. For this, the through holes in the pressure distribution plate can be arranged inclined with respect to the axial direction, i.e. they may have a radial component. In another embodiment, the distribution plate can comprise radial oriented bores with axially oriented blind holes on both sides of the distributor plate to connect the timing holes at the cylinder block front face on one side and the distribution conducts on the other side of the rear case part side. This allows a designer to arrange the internal distribution conducts radially outside of the internal annular flow passages.

By applying the idea according to the invention to integrate the annular flow passages and the distribution conducts into the rear case part, a control bore for a 2-speed or 3-speed control unit controlling the rotational speed of a radial piston unit can be integrated in the single-piece rear case, having a control spool with a greater diameter as compared to radial piston units of the state of the art showing a comparable volumetric size. The control unit, likewise to the state of the art, is connected to the inlet, the outlet, and the annular flow passages. The control spool inside the control bore is movably accommodated and capable of guiding the hydraulic fluid from the inlet to at least one of the annular flow passages and of guiding hydraulic fluid from another annular flow passages to the outlet by means of control recesses arranged at skin surface of the control spool.

In deviation to the state of the art, this control spool can be of bigger diameter than similar control spools of radial piston units according the state of the art with comparable volumetric size. In general, it is another ongoing object in the art to use a control spool having a diameter as big as possible in order to improve the ratio of flow forces and spool forces, which reduce positional errors of the control spool. The bigger the diameter of the control spool, the higher the spool forces which can be created by the hydraulic forces acting on at least one front face of the control spool. The higher the spool forces, the better the controllability of the spool position. By means of improving the position accuracy by raising the control spool diameter, the better a 2- or even 3-speed controllability of the radial piston unit. By implementing such a bigger radial control spool, the radial piston unit can be switched more precisely from a full-torque operating condition, in which all working volumes are charged with high pressure, to a partial-torque condition, in which only two thirds, half amount, or one third of the working volumes are charged with high pressure. When the control piston is changed from a full-torque position to a reduced torque position, a reduced number of working volumes is charged with high pressure and the rotational speed of the radial piston unit is changed reciprocally. The remaining working volumes are "short circuited", such that the hydraulic fluid in these non-charged working volumes is moved from one pressure-reduced working volume to another pressure-reduced working volume without generating mechanical energy.

From the increased diameter of the control spool derives another preferred embodiment of the invention, in which a smoothening notch, which axially protrudes from at least one of the control recesses at the skin of the control spool, can be changed in shape as well as in size in order to provide a fluid connection with a reduced cross-section between the inlet or the outlet and the annular internal flow passages. This notch is provided in order to reduce hard changes when changing from one operating condition to another. This especially occurs in conditions when the radial piston unit is operated with cold hydraulic fluid. According to the invention, the notch can be formed with a constant cross section or with a monotonically decreasing cross section. In the state of the art, such notches have frequently been of a stepped-design due to low space available at the skin surface of the control spool and/or taking into account positioning errors of the control spool. As the control spool diameter according the invention can be increased and the position accuracy of the control spool is improved, a constant cross-section for the notch on the control spool can be used without negatively influencing the running of the radial piston unit or endangering other parts of the radial piston unit due to abrupt pressure changes in the annular flow passages, for instance, the seals used in the state of the art for sealing the distributor element with the rear case part.

In a further embodiment of the invention, a check valve means can be implemented within an internal bore in the control spool, which check valve means can enable a hydraulic path in the reduced torque-position of the control spool if the pressure in one of the annular internal flow passages sinks below a pre-defined threshold volume. Such a check valve provides for securing that working pistons in the working volumes cannot move without displacing hydraulic fluid, which mitigates the danger of hard physical contact of the working piston rollers with the cam lobes. The arrangement of such a security check valve within the control spool is possible as the outer diameter of the control spool according the invention can be increased and sufficient space radially inside the control spool is available, finally due to the compact design of the package of internal annular flow passages and internal distribution conducts in the rear case part according to the invention.

In another preferred embodiment of the invention, as radially inwards of the rear case part space is available, at least part of a brake mechanism can be located in the internal volume due to the disappearance of the distributor element used in the state of the art radial piston units. Preferably, at least the brake discs of such a brake mechanism can be arranged within this region radially inwards of the rear case part, in particular radially inside the package of annular flow passages and distribution conducts. When elements of such a brake mechanism are moved axially inside the single-part rear case part, the total axial length of the radial piston unit can be reduced. Thereby, practically no further change in the design of a park brake mechanism has to be done with respect to existing radial piston units. Basically, only the park brake mechanism has to be displaced axially towards the front case.

In a further embodiment of the invention, an additional bearing means or one of the two bearings means, usually located in the front case part, can be placed in the gained space available radially inside of the rear case part in order to reduce the axial length of the front case part and, therewith, the total axial length of the radial piston unit. This also improves the bearing conditions of the drive shaft with the attached cylinder block, as it allows to support the cylinder block on both sides. Another benefit achieved by placing one bearing to the rear case part lies in that the drive shaft can be extend to the park brake mechanism as one single part drive shaft. In the state of the art, the shaft for the park brake mechanism is commonly separated from the drive shaft in order to avoid a transmission of vibrations and aligning errors of the park brake mechanism to the distributor element located in the rear case part, which would have caused at least sealing problems of the separate distributor element to rear case. Also unbalanced mass, e.g. of the park brake mechanism, in particular of the brake discs, or forces related to incorrect or erroneous balancing or forces stemming from a misbalance are transmitted easily to the cylinder block, when the drive shaft extends in an non-supported manner in an overhang bearing arrangement as a continuous shaft until the rear end of the radial piston unit. According to the invention, the possibility of arranging one bearing at the rear case part support for a continuous drive shaft receiving the park brake discs can be provided. As the rear bearing is supported directly in the rear case part, no sealing surfaces can be affected negatively and it provides a stable and robust bearing support for the drive shaft and the brake mechanism.

From the above description, a person with skills in the relevant art derives that with forming the annular flow passages and the distribution conducts integrally within the rear case part and moving the annular flow passages and the distribution conducts towards the radial outside of the rear case part, the axial length of a radial piston unit can be reduced significantly. By implementing the inventive idea, further parts of a radial piston unit can be displaced to the gained internal radial space/volume in the rear case part. Embodiments, which are not described above or below, which are, however, within the knowledge of a person with skills in the relevant art, are covered by the inventive idea, too. So, the new design of a rear case part with integrally formed internal annular flow passages and integrally formed internal distribution conducts according to the invention provides for a plurality of design improvements to reduce the axial length of radial piston units.

BRIEF DESCRIPTION OF THE DRAWINGS

The invention described above in general is now further detailed with the help of annexed figures, in which preferred embodiments and preferred design possibilities are shown; however, these preferred embodiments do not limit the scope of the inventive idea. Further modifications within the possibilities of the knowledge of a person with skills in the relevant art can be implemented without leaving the spirit of the invention. Furthermore, the shown preferred embodiments can be combined with one another without leaving the spirit of the invention. In the Figures it is shown.

DETAILED DESCRIPTION

Figure 1:
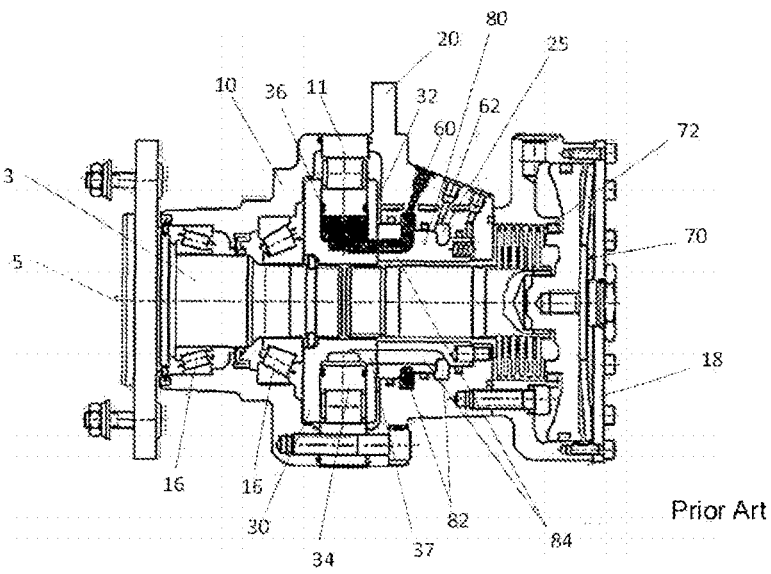
FIG. 1 shows a longitudinal section cut of a radial piston unit according to the state of the art.

In FIG. 1, a radial piston unit according to the state of the art is shown. Inside a front case part 10, a drive shaft 3 is mounted by means of bearing means 16, such that the drive shaft 3 can rotate around a central axis 5. The drive shaft 3 extents towards a rear case part 20, wherein on its free, protruding end a cylinder block 30 is fixed to the drive shaft 3 in a torque proofed manner. As can be seen in FIG. 1, drive shaft 3 is designed in a two-part manner, wherein the intersection/transition between the two parts of the drive shaft 3 is located in the area of cylinder block 30, such that both parts of drive shaft 3 can be driven by/can drive cylinder block 30. A person with relevant skills in the art knows that the second part of drive shaft 3 can be omitted if no park brake mechanism 70 is present at the radial piston unit, as the function of the second part of drive shaft 3 is basically to connect the cylinder block 30 with the park brake mechanism 70 mechanically. From FIG. 1, it can also be seen, that drive shaft 3—independently if it is designed in a one- or two-part manner—is supported only in the front case part 10 and protrudes towards the park brake mechanism 70 in the rear case part 20, where the drive shaft 3 is not supported.

The radial piston unit of FIG. 1 disposes, as seen in the longitudinal/axial direction, i.e. along the central axis 5 axially behind the cylinder block 30, radially inside the rear case part 20, a separate fluid distributor element 80. The fluid distributor element 80 shows a stepped cylindrical design, wherein at each step in radial direction an open circumferential groove is formed on the outside. The circumferential grooves on the fluid distributor element 80 form together with circumferentially running, radial inward open annular grooves in the rear case part 20 annular flow passages 82. The two annular passages 82 shown in FIG. 1 are at different pressure levels, which is indicated by different colors. The annular flow passages 82 are connected by means of distribution lines 84 formed within the fluid distributor element 80 to timing holes 37 located on the front face of cylinder block 30, which faces towards rear case part 20. In order to have the radial piston unit running, half the amount of the distribution lines 84 are charged with high pressure and the other half of distribution lines 84 guide low pressure to the outlet 62. In order that one half of the distribution lines 84 can be connected to one of annular passages 82 and the other half of the distribution lines 84 can be connected to the other annular flow passage 82, the annular flow passages 82 can be on different reference diameters. Therefore, the fluid distributor element 80 shows a stepped cylindrical design. Typically in the state of the art, eight or ten working volumes 36 are disposed within the cylinder block 30 for radial piston units showing a (total) volumetric size of 600 cc to about 950 cc, for instance.

In axial direction behind the rear case part 20, the radial piston unit 1 according to the state of the art shows a park brake mechanism 70, comprising a plurality of brake disc 72. As the functionality of such a park brake mechanism 70 is known to a person skilled in the art, further detailing is omitted.

Figure 2:
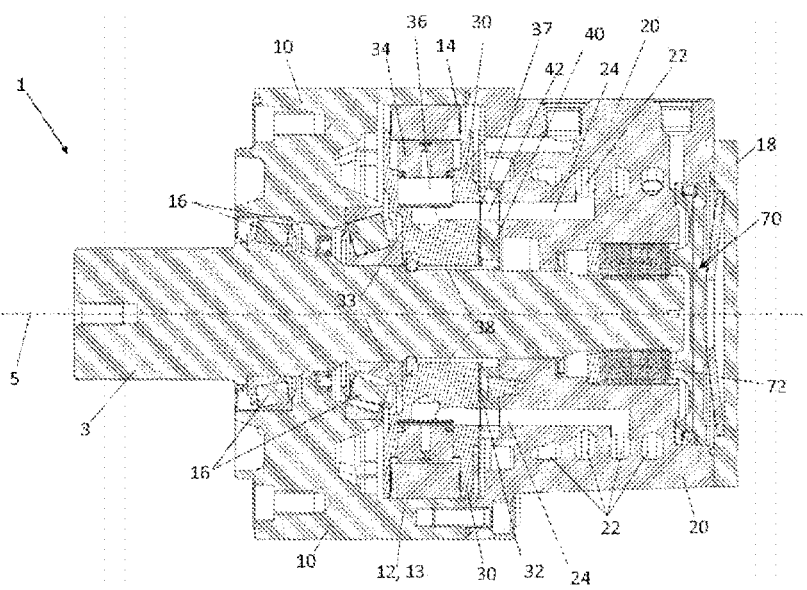
FIG. 2 shows a longitudinal section cut of a radial piston unit according to a first embodiment of the invention.

In FIG. 2, a longitudinal section cut of a radial piston unit 1 according to the invention is shown, basically in the same orientation as the radial piston unit according to the state of the art shown with FIG. 1. Deviating from the state of the art, it can be seen from FIG. 2 that no separate fluid distributor element 80 is present. According to the invention, the functions of the distributor element 80 of the state of the art are integrated in the rear case part 20. Especially, internal annular flow passages 22 are formed integrally within the rear case part 20 as well as internal distribution conducts 24, which connect the internal annular flow passages 22 with the timing holes 37 located at the front face 32 of the cylinder block 30. As the internal distribution conducts 24 as well as the internal annular flow passage 22 are designed to be cavities in the rear case part 20, each of the internal distribution conducts 24 can be designed individually with a greater freedom in design, as neither a machining of these annular flow passages 22 and internal distribution conducts 24 nor a machining of a fluid distribution part is necessary.

Due to the greater freedom in design for arranging the internal annular flow passages 22 and the internal distribution conducts 24, these elements can be packed closer to each other and/or can be moved towards the radial outside of the rear case part 20. As a consequence, more internal space is available radial inwards of rear case 20. This bigger internal volume in the rear case part 20 can be used, according to the invention, for other elements part of a radial piston unit 1, e.g., in order to reduce the total axial length of radial piston unit 1.

In FIG. 2, a plurality of possibilities to reduce the total axial length of a radial piston unit 1 according to invention are shown, which can be implemented separately but also together corresponding to the requirements/functions which have to be fulfilled by the radial piston unit 1.

In one exemplary embodiment, the brake discs 72 of a park brake mechanism 70 are placed inside the rear case part 20, i.e. radially inside the internal annular flow passages 22 and the internal distribution conducts 24, respectively. In the prior art, at this location the fluid distributor element 80 was arranged.

In an another preferred embodiment shown with FIG. 2, a pressure force distribution plate 40 is located between the cylinder block 30 on that side of the cylinder block front face 32 on which the timing holes 37 are located, i.e. at that side of cylinder block 30 that faces towards the rear case part 20, and the rear case part 20. This pressure force distribution plate 40 is functioning, e.g., as running surface for the cylinder block 30. As the pressure force distribution plate 40 does not have to fulfill sealing functions to the rear case part 20 as the distribution element know from the art does, the pressure force distribution plate 40 can be designed specifically to fulfill its main functionality, i.e. to reduce friction for the turning cylinder block 30. For this, the pressure force distribution plate can be designed disc shaped as a basically standard shaped part of specific material reducing friction and wear at the cylinder block 30. As the pressure force distribution plate 40 is of simple geometry, one can also think about designing it as a wear part. As no other sealing requirements in radial direction have to be fulfilled by the pressure force distribution plate, like in the prior art by the fluid distributor element, the diameter of pressure force distribution plate 40 can be selected bigger in order to increase the running surface, which reduces friction forces and gives more axial stability to the cylinder block 30.

As shown with FIG. 2, the pressure force distribution plate 40 shows through holes 42 for connecting the internal distribution conducts 24 in the rear case part 20 with the timing holes 37 of cylinder block 30. Further, the pressure force distribution plate 40 is fixed in axial direction to the rear case part 20, for instance, in a kind of floating manner; simultaneously it is pressed by pressure force distribution pistons 44 (shown in FIG. 3) against the cylinder block front face 32, on which the timing holes 37 are arranged. When applying such a floating assembly manner, a hydrostatic bearing between the cylinder block front face 32 and the corresponding front face on the distribution plate 40 can be built up when the radial piston unit 1 according to the invention is operated. This is achieved by the fact that half of the through holes 42 through the pressure force distribution plate 40 are charged with high pressure in an alternating way with through holes 42 guiding expanded hydraulic fluid to the corresponding internal distribution conducts 24 in the rear case part 20, such that an opening/separating force at each second timing hole between the cylinder block 30 and the pressure force distribution plate 40 is created. In order to maintain the close contact between the cylinder block front face 32 and the pressure force distribution plate 40, distribution pistons 44 press the pressure force distribution plate 40 towards the cylinder block 30. As every second through hole in the pressure distribution plate 40 is charged with high pressure and the corresponding other through holes 42 are filled with at least hydraulic fluid under low pressure, a hydraulic fluid film can be established between the cylinder block front face 32 and the pressure force distribution plate 40. The pressure pistons 44 are mounted, for instance, in the rear case part 20 in blind holes 46 and pressed against the pressure distribution plate by means of springs 48. A person skilled in the art detects that this is only one of a plurality of possibilities to press the pressure distribution plate 40 against cylinder block 30. Thus, other possibilities, e.g., using a disc spring or charging the pressure pistons with hydraulic fluid under pressure, e.g., high pressure or case pressure, or any other possibility is covered by the inventive idea. A further possibility consist in arranging hollow pressure pistons 44 at the end of the internal distribution conducts 24, such that hydraulic fluid can pass through the pressure pistons 44 and, at the same time, pressure forces are generated at the ring surfaces facing to the internal distribution conducts 24, forcing the pressure pistons 44 against the pressure force distribution plate 40, and, furtheron, the pressure force distribution plate 40 against the cylinder block front face 32.

In implementation of the inventive idea, in another embodiment, the cylinder block 30 can be provided with a recess 33 on its side facing the front case part 10. In this recess 33, which is adjacent to the through bore 38 through which the drive shaft 3 passes, the inner shell of a bearing 16 can be accommodated at least partially, such that the total axial length of the front case part 10 and therewith the total axial length of the radial piston unit 1 can be reduced. This is also enabled by the inventive effect that the internal distribution conducts 24 can be arranged on a bigger reference diameter than it is possible with the state of the art design. Hence, the working volumes 36 can be arranged to the radial outside freeing space for the recesses 33.

With moving the working volumes 36 to the radial outer region, their diameter, i.e. the diameter and the height of the working pistons 34, can be reduced without reducing available torque. By reducing the working volumes 36 in diameter, an increased amount of working volumes 36 around the circumference can be arranged, e.g. 12 working volumes 36. So, the total volumetric size compared to radial piston unit of the prior art with comparable radial outer dimensions can be maintained or even increased. Thus, the available torque can be maintained or even increased with respect of radial piston units known from the prior art.

Figure 3:
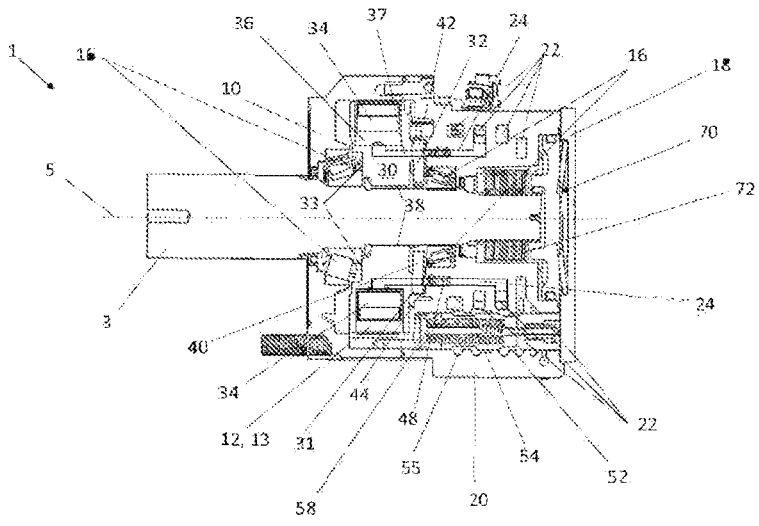
FIG. 3 shows a longitudinal section cut of a radial piston unit according to a second embodiment of the invention.
Figure 4:
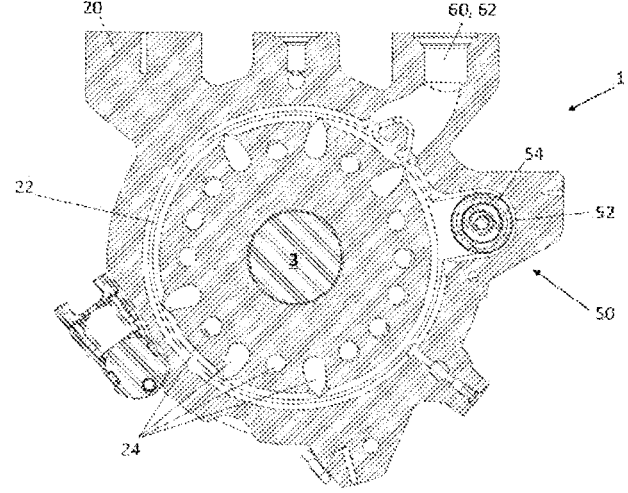
FIG. 4 shows a cross section through the radial piston unit according to FIG. 2.
Figure 5:
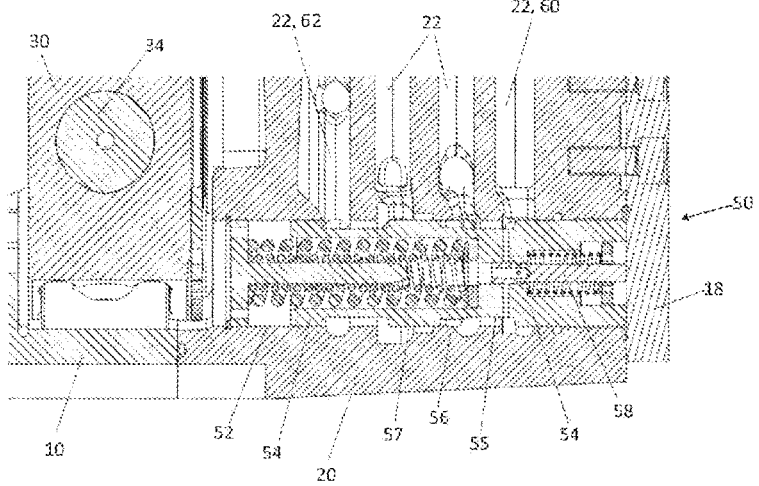
FIG. 5 shows a control unit of the embodiment according to FIG. 2 in a detailed view.

In another embodiment as shown in FIG. 3 of the invention, one of the two bearings 16, which are used in the state of the art at the front case part 10 area to support drive shaft 5 in a protruding manner, can be moved according to the invention to the rear case part 20 area. This can be done because no separate fluid distributor part 80 is present any longer in the rear case part 20 area. In the radial piston units of the state of the art, such a bearing 16 in the area of the rear case part 20 could not have been implemented in order not to endanger the sealing conditions between the separate fluid distributor part 80 and the rear case part 20. According to the invention, as the distribution system is integrally formed within the rear case part 20, one of the two bearings 16—usually a roller or a needle bearing—can be moved to the rear case part 20 region. This reduces substantially the axial length of front case part 10 without enlarging the axial length of rear case part 20. A person skilled in the art obviously derives from FIG. 3 also that when a bearing 16 is arranged at the rear case part 20, and when no park brake mechanism 70 is needed, a very compact radial piston unit design with a minimum axial length is achieved. However, as depicted with FIG. 3, both assembly groups, i.e. the bearing means 16 as well as the park brake mechanism 70, can at least partially be integrated radially inside of rear case part 20. Thereby, the axial length compared to a radial piston unit according to the state of the art is reduced significantly.

In a further embodiment shown as well in FIG. 3, a control unit 50 can be integrated into the rear case part 20, as well. Such a control unit 50 comprises a control bore 52, within which a control spool 54 is movably disposed in axial direction of the control bore 52. Control spool 54 comprises one or more control recesses 55 for opening and closing an inlet 60 and an outlet 62 of a radial piston unit 1, respectively. Such control units 50 are well known in the state of the art, hence, explanation to its functionality can be omitted. However, the control unit 50 according to the present invention deviates from commonly known control units in that the diameter of the control bore 52 as well as the corresponding diameter of the control spool 54 can be chosen bigger than it is possible with integrated control units 50 in rear cases of radial piston units known from the art, having comparable radial outer dimensions. This especially applies to radial piston units with a comparable volumetric size. For example for radial piston units of the volumetric range between 600 cc and 950 cc in the state of the art control spools with a diameter of about 18 mm were used. In radial piston units according to the invention control spool diameters of about 30 mm or more are possible. Obviously, in bigger rear cases of bigger volumetric radial piston units bigger control units can be implemented. However, when comparing rear cases according to the invention to ones according to the state of the art having more or less the same radial outer dimensions, the inventive idea to integrate the internal flow passages 22 and the internal distribution conduct 24 into the rear case part 20 provides more space for the control unit 50. Hence, a bigger control spool diameter can utilized.

When utilizing such a control spool 54 increased in diameter, a better control of the radial piston unit 1 is possible, as, known to a skilled person, bigger control surfaces or control ring surfaces or bigger differences of two control surfaces or control ring surfaces are realizable. Further, bigger control surfaces provide greater control forces and, therefore, more accuracy in positioning the control spool with lower hysteresis and with a higher displacement speed.

With increasing the diameter of control spool 54, a smoothening notch 56 extending axially from at least one recess 55 at control spool 54 in axial direction, having a dead end, can be redesigned and optimized for fulfilling a better functionality. Such smoothening notches 56 are known from the state of the art, too, and are introduced to control spools 54 in order to smoothen operating condition changes, for instance, switching from a full torque operating condition of the radial piston unit to half torque/double speed operating condition. This especially is important when the used hydraulic fluid is still cold and shows a high viscosity. Here, it is obvious for a person skilled in the art that the cross section of such a smoothening notch 56 has great influence when changing from one operational state to another. By applying the inventive idea to radial piston units, these smoothing notches 56 can be designed as constant or continuously reducing grooves with possibly bigger cross sections reducing towards the dead end of a smoothing notch 56. In the state of the art, these notches show a stepped design.

In a further embodiment of the radial piston unit according to the invention, it is also possible to move the internal distribution conducts 24 radially outwards of the internal annular flow passages 22, i.e. to move the internal annular flow passages 22 radially inside of the internal distribution conducts 24. By doing this, the timing holes 37 in the cylinder block 30 can also be moved towards the radial outside of the cylinder block 30. Thereby, if necessary, reducing the working volumes 36 in the cylinder block 30. In order to not lose volumetric size of the radial piston unit, the number of working spaces 36, i.e. the number of cylinders and working pistons 36 can be raised, as the working volumes 36 can be arranged on a greater reference diameter. So, for instance for 600 cc to 950 cc radial piston units, it is possible to increase the number of working pistons 34 to twelve. For this exemplary range of volumetric sizes the number of working volumes was limited up to now in the state of the art to a number of ten by using a cam disc with six cam lobes, for instance. By increasing, according to the invention, the number of working pistons 34 to twelve for radial piston units with comparable volumetric size, and using a cam disc 12 having nine cam lobes 13, a 3-speed radial piston unit can be realized, for example.

As known from the art, when some working volumes will not be charged with high pressure, i.e. no high pressure is supplied to part of the timing holes, the torque of the radial piston unit drops, however, its speed increases. Here, it has to be guaranteed that a sufficient number of working volumes is charged with high pressure. Other non-pressurized working volumes are usually short-circuited and do not discharge hydraulic fluid to the outlet, for instance. When utilizing a cylinder block having twelve working volumes, operating states with charging only eight or only four of the twelve working volumes with high pressure is imaginable. Finally, by applying the inventive idea to a radial piston unit, three operating conditions having full torque, two thirds of full torque or only one third of full torque, is possible. Correspondingly, for fulfilling the performance equation of volumetric size multiplied by rotational speed, the rotational speed increases reciprocally with reducing working volumes charged with high pressure.

In a further embodiment according to the invention, as the control spool 54 of the integrated control unit 50 is increased in diameter with respect to a comparable situation in the state of the art, inside the control spool 54, check valve means 58—also called anti-cavitation means—can be introduced to guarantee that a minimum pressure is maintained in the internal annular flow passages 22, i.e. in at least the ones which are short-circuited working volumes 36 when the radial piston unit is operated in a reduced torque condition.

From the above disclosure and the accompanying Figures and claims, it will be appreciated that the hydraulic radial piston unit 1 according to the invention offers many possibilities and advantages over the prior art. All modifications and changes within the scope of the claims are intended to be covered thereby. It should be further understood that the examples and embodiments described above are for illustrative purposes only and that various modifications, changes or combinations of embodiments in the light thereof, which will be suggested to a person skilled in the relevant art, are included in the spirit and purview of this application.

What is claimed is:

1. A hydrostatic radial piston unit comprising:
   a front case part accommodating a drive shaft via shaft bearing means so that the drive shaft can rotate around a central axis relative to the front case part;
   a rear case part attached on one side to the front case part and closed on another side in order to define an internal volume;
   a cylinder block disposed in the internal volume and attached to the drive shaft in a torque proof manner, wherein axially disposed timing holes in the cylinder block connect radially oriented working volumes in the cylinder block with a cylinder block front face that is arranged perpendicularly to the central axis and faces away from the front case part;

wherein within the rear case part internal annular flow passages connected to an inlet and an outlet of the radial piston unit and running basically in circumferential direction around the central axis, as well as internal distribution conducts configured to hydraulically connect the internal annular flow passages with the cylinder block timing holes, are formed integrally, wherein the hydrostatic radial piston unit comprises a park brake mechanism located on the rear side of the internal volume, wherein the brake discs of the park brake mechanism are arranged axially within the rear case part and are disposed at least partially radially inside of the internal annular flow passages such that the brake discs are, at least partially, arranged between the plurality of internal annular flow passages and the central axis along a radial plane from the central axis.

2. The hydrostatic radial piston unit according to claim 1, further comprising a pressure force distribution plate fixed to the rear case part between the cylinder block and the rear case part, comprising through holes connecting the cylinder block timing holes with the internal distribution conducts, wherein the through holes are oriented parallel or inclined with respect to the central axis.

3. The hydrostatic radial piston unit according to claim 1, further comprising a control bore in the rear case part to which the inlet, the outlet and the internal annular flow passages are connected, such that a control spool movably accommodated in the control bore is capable to guide hydraulic fluid from the inlet to the internal annular flow passages and to guide hydraulic fluid from the internal annular flow passages to the outlet via control recesses arranged at the skin surface of the control spool.

4. The hydrostatic radial piston unit according to claim 3, wherein in a full-torque position of the control spool the timing holes are in an alternating order connected to the inlet or the outlet via the internal distribution conducts, and wherein in a reduced-torque position of the control spool less internal distribution conducts are connected to the inlet than in the full-torque position of the control spool.

5. The hydrostatic radial piston unit according to claim 3, wherein the control spool comprises at least one notch which axially extends on the skin surface from at least one of the control recesses such that a fluid connection with reduced cross section can be established between the inlet or outlet and the internal annular flow passages.

6. The hydrostatic radial piston unit according to claim 5, wherein the depth and/or width of the notch in axial direction is constant or increases or decreases monotonically towards its dead end.

7. The hydrostatic radial piston unit according to claim 3, wherein the diameter of the skin surface of the control spool is increased compared to control spools of prior art hydraulic radial piston units of comparable displacement volume and having a rear case part without internal annular flow passages integrally formed therein.

8. The hydrostatic radial piston unit according to claim 3, wherein check valve means are arranged inside the control spool, such that in the reduced torque-position hydraulic fluid can be provided to the internal annular flow passages, if the pressure in one of the internal annular flow passages sinks below a predefined threshold.

9. The hydrostatic radial piston unit according to claim 1, wherein the park brake mechanism is fail-safe and actuable hydraulically or electro-mechanically.

10. The hydrostatic radial piston unit according to claim 1, wherein the rear case part is closed by a housing cover on the side facing away from the front case.

11. The hydrostatic radial piston unit according to claim 1, wherein the working volumes in the cylinder block are sealed by radially moveable working pistons arranged in working volumes, and wherein, under operational conditions of the radial piston unit, the piston movements are guided by cam lobes on an inner cam surface of a cam disk against which the pistons abut, wherein further the working volumes and/or the pistons comprising a surface-finished surface.

12. The hydrostatic radial piston unit according to claim 11, wherein the number of working pistons and the number of cam lobes on the cam disk is increased in comparison to prior art radial piston units of comparable displacement volume having a rear case part without internal annular flow passages integrally formed therein.

13. The hydrostatic radial piston unit according to claim 11, wherein the cam disk is integrally formed with the front case part.

14. The hydrostatic radial piston unit according to claim 1, wherein one bearing means is located in the rear case part and another one is located in the front case part.

15. The hydrostatic radial piston unit according to claim 1, wherein, under operational conditions of the radial piston unit, the opening forces exerted on the pressure force distribution plate via the fluid pressure in the cylinder block timing holes are balanced by pressure pistons abutting against the pressure force distribution plate, and forced against the pressure force distribution plate by means of pressure springs and/or by fluid pressure.

16. The hydrostatic radial piston unit according to claim 15, wherein the pressure pistons are arranged coaxially in the internal distribution conducts.

17. The hydrostatic radial piston unit according to claim 1, wherein the rear case part is manufactured by sand casting, additive manufacturing technique or primary shaping technique with lost cores.

18. The hydrostatic radial piston unit according to claim 1, wherein the cylinder block comprises at least on one side an axial oriented recess adjacent to an axial through bore, in which the drive shaft is received, wherein the at least one recess is provided for receiving part of a bearing inner or outer shell and/or at least partially the pressure force distribution plate.

19. A hydrostatic radial piston unit comprising:

a front case part accommodating a drive shaft via shaft bearing means so that the drive shaft can rotate around a central axis relative to the front case part;

a rear case part attached on one side to the front case part and closed on another side in order to define an internal volume;

a cylinder block disposed in the internal volume and attached to the drive shaft in a torque proof manner, wherein axially disposed timing holes in the cylinder block connect radially oriented working volumes in the cylinder block with a cylinder block front face that is arranged perpendicularly to the central axis and faces away from the front case part;

wherein within the rear case part internal annular flow passages connected to an inlet and an outlet of the radial piston unit and running basically in circumferential direction around the central axis, as well as internal distribution conducts configured to hydraulically connect the internal annular flow passages with the cylinder block timing holes, are formed integrally, wherein the hydrostatic radial piston unit comprises a park brake mechanism located on the rear side of the internal volume, wherein the brake discs of the park brake mechanism are arranged axially within the rear case part and are disposed at least partially radially inside of the internal annular flow passages, and under operational conditions of the radial piston unit, the opening forces exerted on the pressure force distribution plate via the fluid pressure in the cylinder block timing holes are balanced by pressure pistons abutting against the pressure force distribution plate, and forced against the pressure force distribution plate by means of pressure springs and/or by fluid pressure.

20. The hydrostatic radial piston unit according to claim 19, wherein the pressure pistons are arranged coaxially in the internal distribution conducts.

\* \* \* \* \*